Aug. 14, 1923.
C. F. KETTERING
STEERING POST LOCK
Filed June 17, 1921
1,464,908
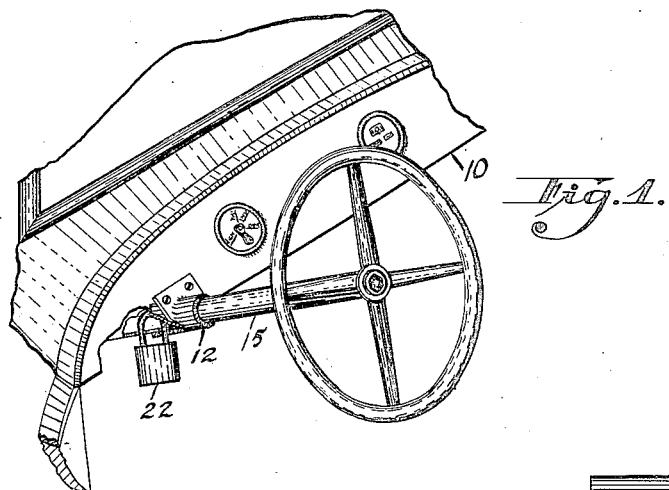
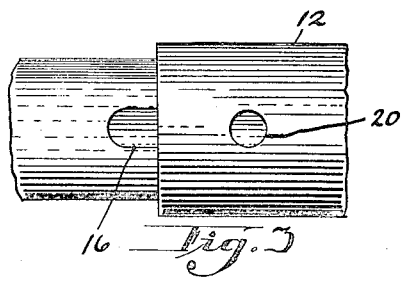
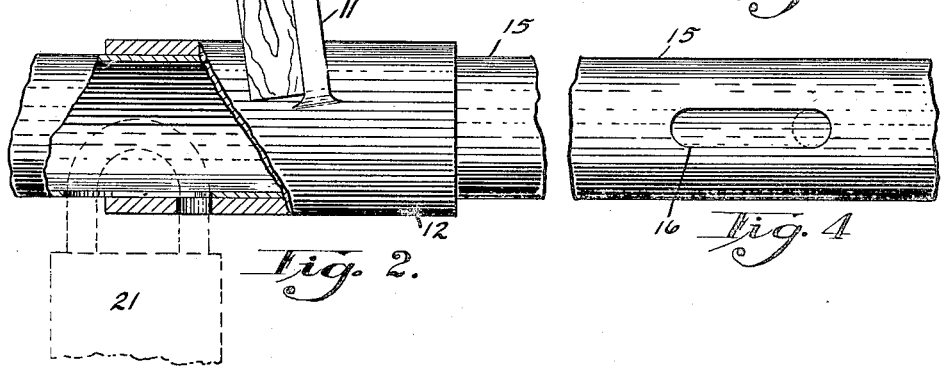
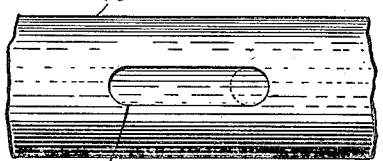

Patented Aug. 14, 1923.

1,464,908

UNITED STATES PATENT OFFICE.

CHARLES F. KETTERING, OF DAYTON, OHIO, ASSIGNOR TO GENERAL MOTORS RESEARCH CORPORATION, OF DAYTON, OHIO, A CORPORATION OF DELAWARE.

STEERING-POST LOCK.

Application filed June 17, 1921. Serial No. 478,426.

*To all whom it may concern:*

Be it known that I, CHARLES F. KETTERING, a citizen of the United States of America, residing at Dayton, county of Montgomery, and State of Ohio, have invented certain new and useful Improvements in Steering-Post Locks, of which the following is a full, clear, and exact description.

The present invention relates to locking means for automotive vehicles and in its preferred form of embodiment which has been chosen for the purposes of description and illustration, relates more particularly to a steering post lock for automobiles.

The objects of the invention include the provision of a simple, economically constructed and repaired, and efficient lock for automobile steering apparatus.

Further objects and advantages of the present invention will be apparent from the following description, reference being had to the accompanying drawing, wherein a preferred form of embodiment of the invention is clearly shown.

In the drawing:

Fig. 1 is a perspective view of a portion of an automobile instrument board cowl and steering wheel and post.

Fig. 2 is an elevation with parts in section of a supporting bracket for a steering post such as is shown in Fig. 1.

Fig. 3 is a plan view of the under side of a portion of the bracket and post.

Fig. 4 is a view similar to Fig. 3 of a portion of the steering post alone.

The automobile, used for convenience of description and explanation, is provided with the usual running gear, power plant, etc., and with the usual means for converting the rotary motion of the steering wheel into the reciprocating motion required for turning the front wheels. None of these elements are shown as they form no part of the present application and are not required to understand the invention.

In the drawing, the instrument board 10 of the automobile is shown having attached thereto a supporting bracket 11 for the steering post. This supporting bracket 11 is provided with a flat portion for attachment to the instrument board and also with a sleeve portion 12 through which extends the steering post 15.

The bracket 11 with its sleeve 12 serves as a support for the steering post 15 and also as a guide and bearing therefor.

In the preferred form of embodiment of the present invention, the steering post 15 is provided with a slot, indicated at 16, adapted to register with an opening 20 in the sleeve 12 of the supporting bracket.

In order to lock the steering wheel from rotation it is sufficient to cause the slot 16 and the opening 20 to register and to insert therein some means for retaining them in registry. Such an object is readily accomplished by the use of padlock 21 such as is clearly indicated in Figs. 1 and 2, the bow of the padlock passing through the opening 20 in the bracket and into the slot 16 in the steering post.

There has been described above a very simple and efficient means for retaining the slot and opening in registry but there are undoubtedly other means for accomplishing this result which may be used without departing from the spirit of the invention.

For example, another means which is contemplated consists in the attachment to the instrument board or to the bracket itself a lock of the ordinary bolt type. In using this form of lock it is sufficient to obtain the registry of the two openings and throw the bolt into them, thus retaining them in registry.

Further, while the form of mechanism herein shown and described, constitutes a preferred form of embodiment of the present invention, it is to be understood that other forms might be adopted, all coming within the scope of the claim which follows.

What I claim is as follows:

In combination, a bracket having a sleeve adapted to form a bearing or guide for a steering post and provided in its wall with an opening; a steering post adapted to be supported in said sleeve and provided with a slot registrable with the opening in said sleeve and extending beyond the latter; whereby the bow of an ordinary padlock may be inserted through said opening and, extending into the slot, secure said post from turning.

In testimony whereof I hereto affix my signature.

CHARLES F. KETTERING.

Witnesses:
L. H. EMRICK,
R. K. LEE.